United States Patent
Hanashima et al.

(10) Patent No.: US 9,707,862 B2
(45) Date of Patent: Jul. 18, 2017

(54) POWER MANAGEMENT APPARATUS AND POWER MANAGEMENT SYSTEM

(71) Applicant: Kabushiki Kaisha Toshiba, Minato-ku (JP)

(72) Inventors: Yumi Hanashima, Funabashi (JP); Hiroki Hara, Tokyo (JP); Miyako Miyoshi, Ichikawa (JP); Hiroyuki Kaneko, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 195 days.

(21) Appl. No.: 14/631,294

(22) Filed: Feb. 25, 2015

(65) Prior Publication Data
US 2015/0165931 A1 Jun. 18, 2015

Related U.S. Application Data

(63) Continuation of application No. PCT/JP2013/004350, filed on Jul. 17, 2013.

(30) Foreign Application Priority Data

Oct. 31, 2012 (JP) .................................. 2012-240758
Nov. 29, 2012 (JP) .................................. 2012-261363

(51) Int. Cl.
*H02J 7/00* (2006.01)
*B60M 3/06* (2006.01)

(52) U.S. Cl.
CPC ..................................... *B60M 3/06* (2013.01)

(58) Field of Classification Search
CPC ....................................................... B60M 3/06
(Continued)

(56) References Cited

U.S. PATENT DOCUMENTS 7,402,982 B2 * 7/2008 Ito .......................... B60L 3/0046
104/287
9,308,832 B2 * 4/2016 Erhard ..................... B61L 3/006
(Continued)

FOREIGN PATENT DOCUMENTS

JP 2009-067206 A 2/2009
JP 2014-046821 * 3/2014 .............. B60M 3/02

OTHER PUBLICATIONS

Combined Office Action and Search Report issued Mar. 1, 2016 in Chinese Patent Application No. 201380044775.2 (with English translation of category of cited documents and statement of relevancy).

*Primary Examiner* — Richard V Muralidar
(74) *Attorney, Agent, or Firm* — Oblon, McClelland, Maier & Neustadt, L.L.P.

(57) ABSTRACT

In one embodiment, a power management apparatus creates a switching plan for switching control of opening/closing of a first switch provided between an energy storage device and a distribution system side, and a second switch provided between the energy storage device and a feeder side, both of which are not closed simultaneously. Further, the power management apparatus determines a switching control content to the first switch and the second switch, according to the created switching plan, and outputs a determined instruction to the first switch and the second switch. In this configuration, the power management apparatus determines presence or absence of interchange of regenerative power between trains up to an optional unit time later, based on train information including an operation diagram, and when the interchange of the regenerative power between the trains is present, creates the switching plan to close the first switch for the unit time, and when the interchange of the regen- (Continued)

erative power between the trains is not present, creates the switching plan to close the second switch for the unit time.

20 Claims, 15 Drawing Sheets

(58) Field of Classification Search
USPC .......................................... 320/101, 128, 137
See application file for complete search history.

(56) References Cited

U.S. PATENT DOCUMENTS

| | | | |
|---|---|---|---|
| 2011/0144831 A1* | 6/2011 | Hata | B60M 3/06 701/2 |
| 2011/0307113 A1 | 12/2011 | Kumar et al. | |
| 2014/0167701 A1* | 6/2014 | Nakatsuka | H02J 3/32 320/134 |
| 2014/0368154 A1* | 12/2014 | Hanashima | B60M 3/06 320/101 |

* cited by examiner

○ YEAR ○ MONTH ○ DAY ( )

| TIME | CHANGEOVER-SWITCH SWITCHING PLAN | CHANGEOVER-SWITCH SWITCHING INSTRUCTION | REMAINING AMOUNT OF ENERGY STORAGE DEVICE AT TIME OF STARTING | REGENERATIVE POWER AMOUNT STORED TO ENERGY STORAGE DEVICE | COEFFICIENT α | POWER AMOUNT DISCHARGED FROM ENERGY STORAGE DEVICE |
|---|---|---|---|---|---|---|
| ⋮ | | | | | | |
| 8:00~9:00 | A | A | 100kWh | 0kWh | 0.9 | 50kWh |
| 9:00~10:00 | B | B | 50kWh | 200kWh | 0.9 | 150kWh |
| ⋮ | | | | | | |

FIG. 6-1

○ YEAR ○ MONTH ○ DAY ( )

| TIME | DIRECTION | TYPE AND CLASSIFICATION | MAIN MOTOR | NUMBER OF MAIN MOTORS / ONE FORMATION | IDEAL REGENERATIVE POWER AMOUNT / ONE FORMATION |
|---|---|---|---|---|---|
| ⋮ | | | | | |
| 8:00 | UP | ○○ SERIES | a | 20 | 100kWh |
| 8:05 | DOWN | XX SERIES | b | 20 | 120kWh |
| 8:10 | UP | XX SERIES | b | 20 | 120kWh |
| ⋮ | | | | | |

FIG. 6-2

○ YEAR ○ MONTH ○ DAY ( )

| TIME | CHANGEOVER-SWITCH SWITCHING PLAN | CHANGEOVER-SWITCH SWITCHING INSTRUCTION | REMAINING AMOUNT OF ENERGY STORAGE DEVICE AT TIME OF STARTING | REGENERATIVE POWER AMOUNT STORED TO ENERGY STORAGE DEVICE | COEFFICIENT α | POWER AMOUNT DISCHARGED FROM ENERGY STORAGE DEVICE | ACCIDENT CONTENT | ACCIDENT GENERATION TIME | OPERATION SUSPENSION TIME |
|---|---|---|---|---|---|---|---|---|---|
| ⋮ | | | | | | | | | |
| 8:00~9:00 | A | A→B | 100kWh | 20kWh | 0.9 | 50kWh | VEHICLE FAILURE | 8:30 | 10 MINUTES |
| 9:00~10:00 | B | B | 70kWh | 200kWh | 0.9 | 150kWh | | | |
| ⋮ | | | | | | | | | |

FIG. 10

O YEAR O MONTH O DAY ( )

| TIME | STATION FACILITY 1 [kWh] | STATION FACILITY 2 [kWh] | ... |
|---|---|---|---|
| ... | ... | ... | ... |
| 8:00~9:00 | 10 | 4 | ... |
| 9:00~10:00 | 12 | 6 | ... |
| ... | ... | ... | ... |

POWER MANAGEMENT APPARATUS AND POWER MANAGEMENT SYSTEM

CROSS-REFERENCE TO RELATED APPLICATION

This application is based upon and claims the benefit of priority from the prior Japanese Patent Application No. 2012-261363, filed on Nov. 29, 2012, and the prior Japanese Patent Application No. 2012-240758, filed on Oct. 31, 2012; the entire contents of which are incorporated herein by reference.

This application is a continuation application of International Patent Application No. PCT/JP2013/004350, filed on Jul. 17, 2013.

FIELD

Embodiments described herein relate to a power management apparatus and a power management system.

BACKGROUND

Efforts of energy management have been spreading in countries of the world for the effective use of power.

As one of the efforts, there is a BEMS (Building and Energy Management System). The BEMS is a system for achieving reduction of energy consumption by performing power management of an equipment/facility and so on in a building. For example, using an art to perform supply and demand adjustment of electric power and so on, by a demand response, the reduction of the electric power and electric power amount of a building is enabled.

As the efforts of energy management in a railway system, there is an effective use of regenerative power using an energy storage device. It is common to use the regenerative power as a power for another train performing power running, but when no train performing power running is present, the power loss due to regenerative invalidation has been generated. As its countermeasure, there is a method in which an energy storage device is installed in a substation, to store regenerative power, and to utilize the power at the time of power running of a train or emergency, for example (Japanese Patent Application Publication No. 2009-67206, for example).

In the case of storing regenerative power in an energy storage device, since regenerative power is generated in a large power/power amount at one time, and is fragmentarily generated, an energy storage device with a limited capacity becomes impossible to effectively use the power, if the power is not systematically charged/discharged. Accordingly, a system to create a charging/discharging plan of an energy storage device to store regenerative power becomes necessary.

In addition, a ratio of a remaining charge power amount to a battery capacity of an energy storage device at the time of full charge is called State of Charge: Charging State (hereinafter, referred to as an SOC). There is a proper range of the SOC for preventing performance deterioration of an energy storage device depending on the kind of the energy storage device, and charging/discharging control of the energy storage device is performed within the proper range. In addition, in the following description, a proper range of an SOC of an energy storage device shall be called an SOC width.

In addition, as described above, in the conventional art, the systematic charging/discharging in an energy storage device has been performed within a SOC width. However, it does not greatly affect the performance deterioration of the energy storage device to temporarily exceed the SOC width. For the reason, there was a case in which the regenerative power cannot be effectively utilized in the conventional art.

BRIEF DESCRIPTION OF THE DRAWINGS

FIG. 6-1 is a diagram showing an example of the database relating to the control result to be stored, in the first embodiment.

FIG. 6-2 is a diagram showing an example of the database relating to an ideal regenerative power amount in each main motor.

FIG. 10 is a diagram showing an example of the database relating to the control result to be stored, in the second embodiment.

DETAILED DESCRIPTION

Figure 1:
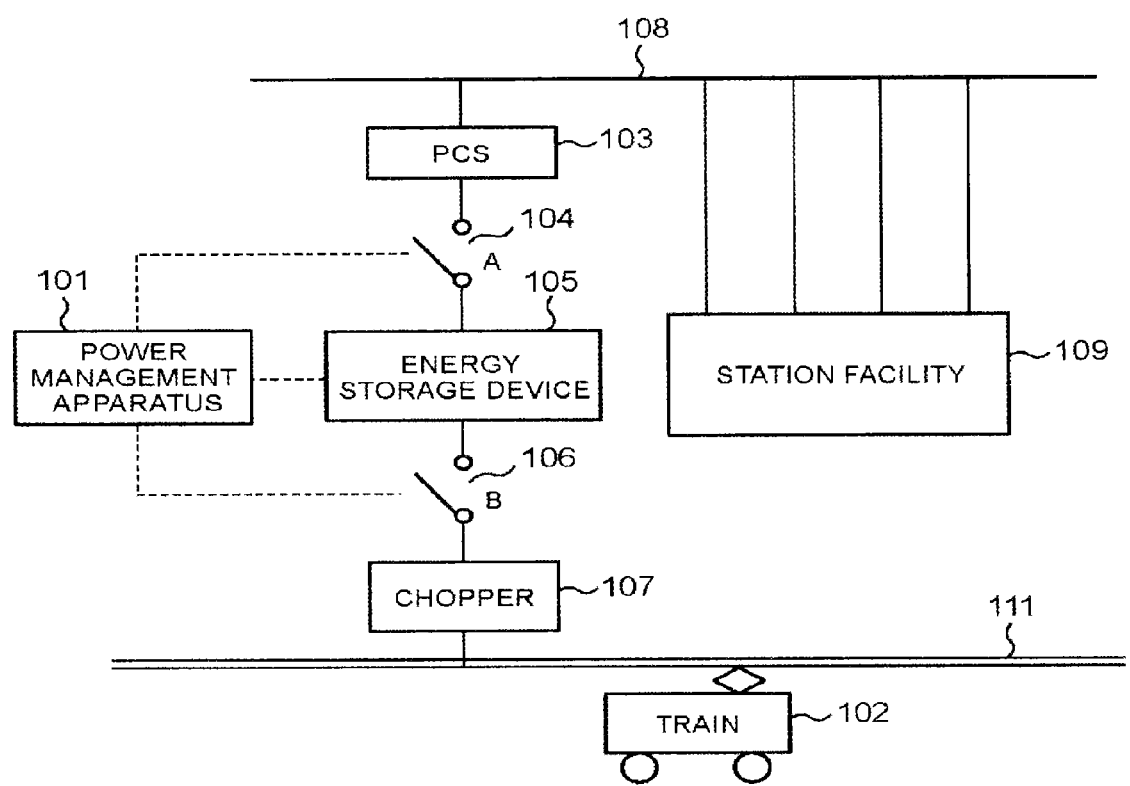
FIG. 1 is a diagram showing a schematic configuration of a station system and an electric railway system which use a power management apparatus of a first embodiment.

According to an embodiment, a power management apparatus is provided with switching plan creation means which creates a switching plan for switching control of opening/closing of a first switch provided between an energy storage device and a distribution system side, and a second switch provided between the energy storage device and a feeder side. Further the power management apparatus is provided with switching determination/instruction means which determines a switching control content to the first switch and the second switch according to the switching plan created by the switching plan creation means, and outputs a determined instruction to the first switch and the second switch.

According to the above-described configuration, the switching plan creation means determines presence or absence of interchange of regenerative power between trains up to an optional unit time later, based on train information including an operation diagram, and when the interchange of the regenerative power between the trains is present, creates the switching plan to close the first switch for the unit time, and when the interchange of the regenerative power between the trains is not present, creates the switching plan to close the second switch for the unit time.

In addition, according to another embodiment, a power management system has an energy storage device which feeds power to a power line for feeding power to a ground facility and a feeder for feeding power to a train, a first switch provided between the energy storage device and the power line, a second switch provided between the energy storage device and the feeder, and a power management apparatus to perform switching control of the first switch and the second switch, and this power management apparatus is provided with plan creation means which determines whether or not an interchange of a regenerative power between trains is present for each prescribed time width, using an operation diagram of the trains and creates a switching control plan for the first switch and the second switch based on this determination result, and control means which, based on the switching control plan created by the plan creation means and a charging state of the energy storage device, controls switching of the first switch and the second switch so that the charging state of the energy storage device becomes within a prescribed charging range, and changes the prescribed charging range in accordance with the regenerative power that is estimated to be stored in the energy storage device based on the operation diagram of the trains.

Further, a power management apparatus according to another embodiment is a power management apparatus which controls feeding of a power stored in an energy storage device to a ground facility via a power line, and feeding of the electric power to a train via a feeder, and is provided with control means which controls switching of a first switch provided between the energy storage device and the power line and a second switch provided between the energy storage device and the feeder, and plan creation means which determines whether or not an interchange of a regenerative power between trains is present for each prescribed time width, using an operation diagram of the trains and creates a switching control plan for the first switch and the second switch based on this determination result, and the control means, based on the switching control plan created by the plan creation means and a charging state of the energy storage device, controls switching of the first switch and the second switch so that the charging state of the energy storage device becomes within a prescribed charging range, and changes the prescribed charging range in accordance with the regenerative power that is estimated to be stored in the energy storage device based on the operation diagram of the trains.

Hereinafter, further embodiment will be described with reference to the drawings.

SUMMARY

Various embodiments described herein assume that an energy storage device which stores powers such as regenerative power that has not been interchanged between trains is installed at a station, and the power stored in the energy storage device is used at both of a feeder side and a distribution system side. In this case, as the configuration thereof it becomes necessary to install a chopper between the feeder and the energy storage device, and it becomes necessary to install a PCS (Power Conditioning System) between the energy storage device and the distribution system. However, a PCS having high insulation resistance has not been developed, and even if it is developed, it is expensive. For the reason, it is practical to install a switch for connection/cutoff control between the energy storage device and the PCS. In addition, if a switch is installed between the energy storage device and the chopper, there is a merit that finely control of the chopper becomes unnecessary.

Accordingly, a power management apparatus of a embodiment is configured such that the above-described switches are installed and controlled. And the regenerative power that has not been interchanged between trains is stored in the energy storage device that is supposed to be installed at a station, and the stored power is discharged to the feeder or the distribution system.

In addition, in the above-described configuration, in order to effectively utilize the energy, in the power management apparatus of the embodiment, creates a plan of switching a switch, in consideration of the timing when the regenerative power from a train is inputted to the energy storage device, the power running of a train, and a load of a station facility, and performs control based on this plan.

For the reason, the various embodiment described later proposes a power management apparatus which is provided with means to create a switching plan of a switch (a changeover-switch switching plan creation unit 131 described later), means to determine switching of the switch and instruct switching of the switch (a changeover-switch switching determination/instruction unit 132 described later), and means to store a switching result of the switch (a control result storage unit 133 described later). In addition, in the present specification, feeding power from the energy storage device to the feeder and the distribution system is called discharging.

Hereinafter, power management apparatuses according to various embodiments will be described with reference to the drawings.

First Embodiment

To begin with, a station system and an electric railway system which utilizes a power management apparatus of a first embodiment will be described in detail. FIG. 1 is a diagram showing a schematic configuration of a station system and an electric railway system which utilizes a power management apparatus of a first embodiment.

A train 102 in an electric railway system operates using power fed from a feeder 111 as a power source. Power is fed from a substation (not shown) to the feeder 111.

In a station, various station facilities 109 such as an elevator, an escalator, lighting are installed.

It is assumed that an energy storage device 105 is installed in a station. The reason for this is because, if the energy storage device 105 is installed in a substation, since a substation is generally located at a position remote from a station, such as between stations, transmission loss is generated at the time of charging and discharging. The energy storage device 105 stores the regenerative power which is generated by the train 102 in the electric railway system and has not been interchanged between trains. The regenerative power of the train 102 passes through the feeder 111, is subjected to the voltage adjustment by a chopper 107, and is stored in the energy storage device 105. In addition, the power is discharged from the energy storage device 105 to the train 102 performing power running in the electric railway system and the station facility 109. For the train 102 performing power running in the electric railway system, the power is subjected to the voltage adjustment by the chopper 107, and is passed to the feeder 111, and for the station facility 109, the power is subjected to DC/AC conversion by a PCS 103 and is passed to a distribution system 108.

A switch-A 104 is installed between the energy storage device 105 and the PCS 103, and a switch-B 106 is installed between the energy storage device 105 and the chopper 107. The reason for this is, because a PCS 103 having high insulation resistance has not been developed, and even if it is developed, it is expensive, and fine control of the chopper 107 becomes unnecessary. However, since an arc is generated, it is assumed that only one of the switch-A 104 and the switch-B 106 can be closed. In addition, in the case that any one of the switches is closed, it is assumed that the one switch is closed after having confirmed that the other switch is opened.

A power management apparatus 101 performs switching control of the switch-A 104 and the switch-B 105 so that the regenerative power of the train 102 in the electric railway system is stored in the power charging device 105 and is discharged to the feeder 111 and the distribution system 108. For this reason, the power management apparatus 101 creates a switching plan for the above-described two switches, determines switching of the two switches and outputs its instruction, and stores the control result of the switching of the switches.

Figure 2:
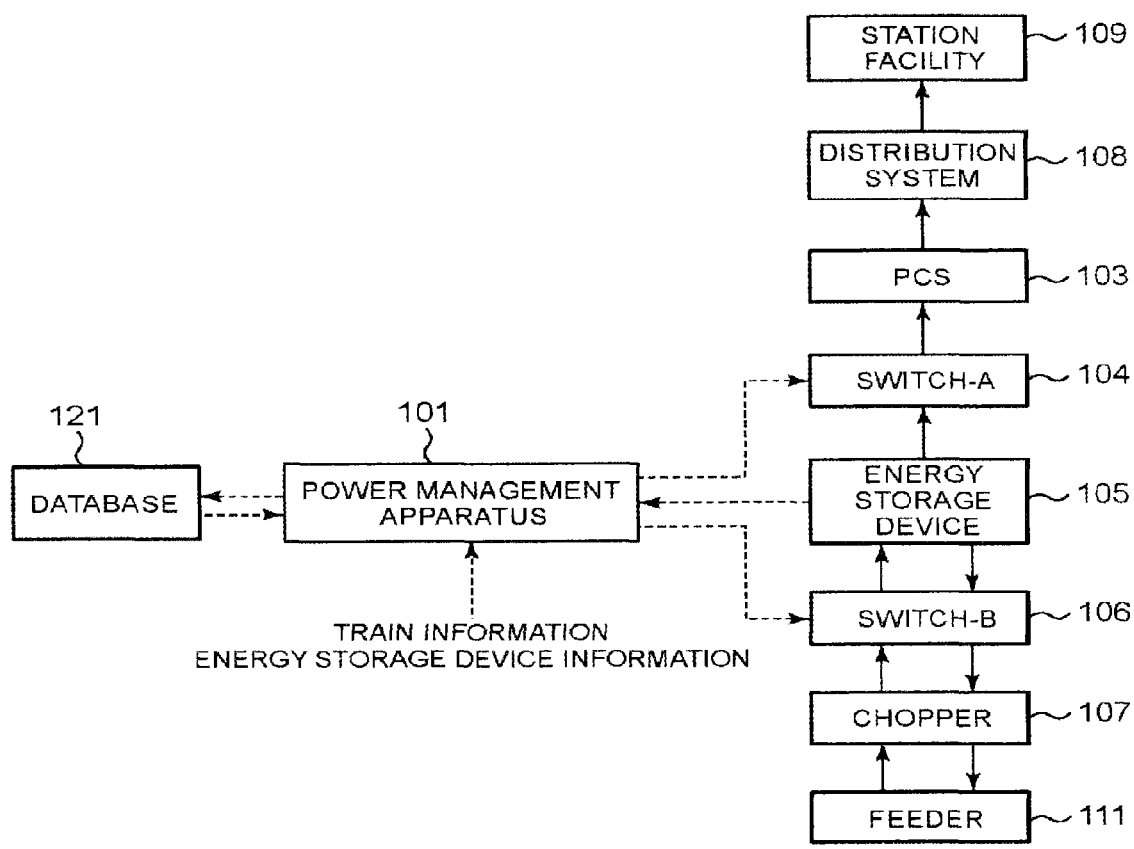
FIG. 2 is a block diagram showing the power management apparatus in the configuration shown in FIG. 1, related devices, and a flow of data and signals to be exchanged.

FIG. 2 is a block diagram showing the power management apparatus in the configuration shown in FIG. 1, related devices, and a flow (an arrow of a dotted line) of data and signals to be exchanged. In addition, an arrow of a continuous line shows a flow of power supply.

The power management apparatus 101 can refer to the information recorded in a database 121 such as a storage device. In addition, the power management apparatus 101 can acquire the train information such as a running curve and an operation diagram from an external device (an operation management apparatus, for example). In addition, the power management apparatus 101 acquires the information of the energy storage device such as a battery remaining amount from a sensor (not shown) and so on provided in the energy storage device 105. The power management apparatus 101 acquires the information such as train information which is recorded in the database 121, and thereby can estimate the regenerative power amount to be stored in the energy storage device 105, and acquires the information of the energy storage device, and thereby can perform charging/discharging in consideration of the battery remaining amount (the detail will be described later).

Figure 3:
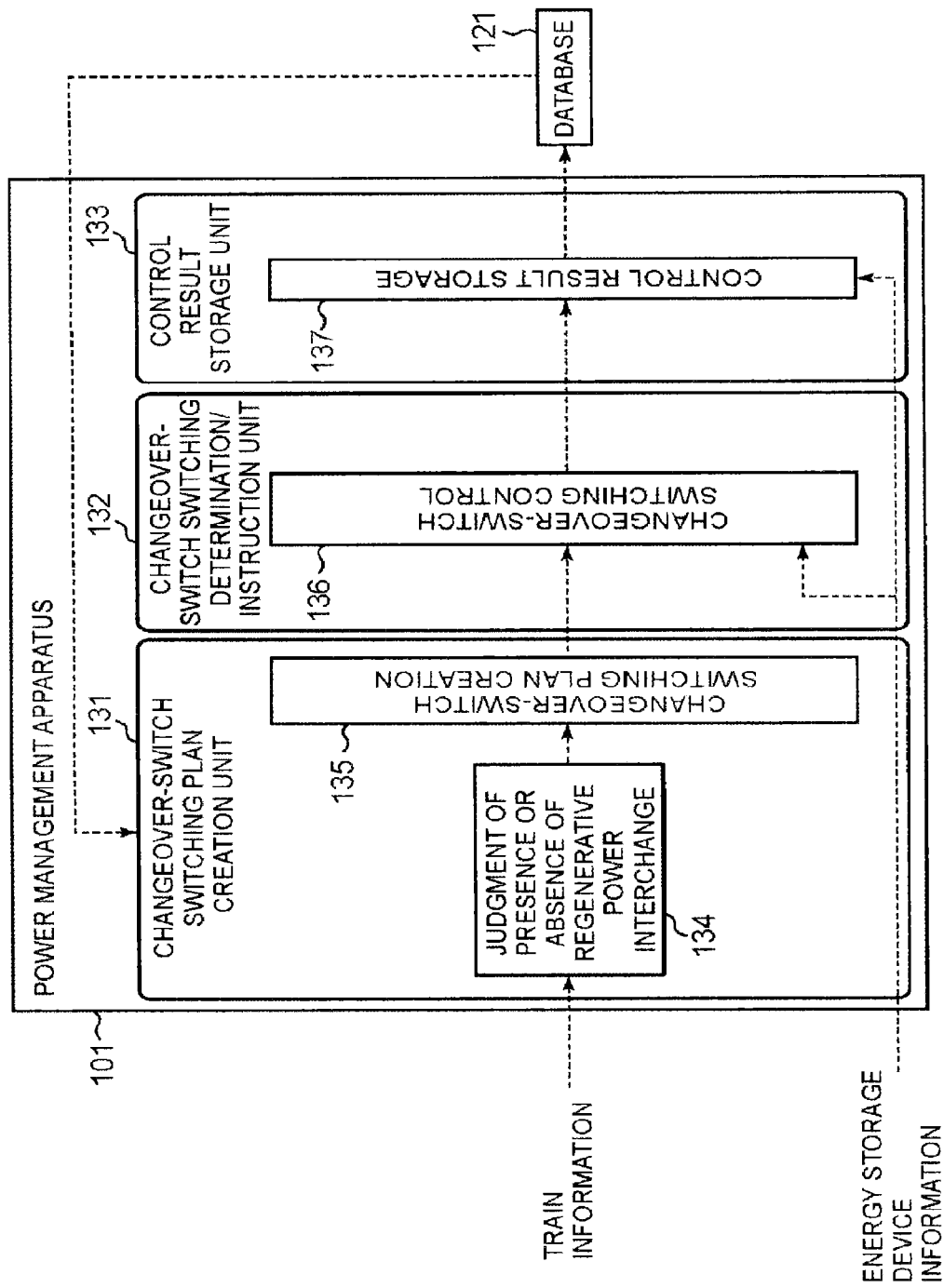
FIG. 3 is a block diagram of the power management apparatus in the first embodiment.

Next, a configuration of the power management apparatus of the present embodiment will be described. FIG. 3 is a block diagram showing a configuration of the power management apparatus of the present embodiment.

The power management apparatus 101 is provided with a changeover-switch switching plan creation unit 131, a changeover-switch switching determination/instruction unit 132, and a control result storage unit 133, as its main portion. Here, the changeover-switch switching plan creation unit 131, the changeover-switch switching determination/instruction unit 132, and the control result storage unit 133 are function units which are realized by the processing that a CPU (Central Processing Unit) develops a program stored in a ROM (Read Only Memory), for example, to a RAM (Random Access Memory) and sequentially executes the program (the CPU, ROM, RAM are not shown).

The changeover-switch switching plan creation unit 131 performs, a processing to estimate a regenerative power amount of the train 102, as its function (or, a processing to be executed), and thereby creates a changeover-switch switching plan. For this purpose, the train information which the power management apparatus 101 has acquired from outside is sent to the changeover-switch switching plan creation unit 131.

The processing to estimate the regenerative power amount by the changeover-switch switching plan creation unit 131 is performed using the acquired train information. The train information which the changeover-switch switching plan creation unit 131 uses for estimating the regenerative power amount includes an operation diagram in a diagram creation device (not shown), and data of a type and classification in a train-set utilization plan creation device, or in the diagram creation device. In addition, the value of the regenerative power amount per formation for each type and classification which is generated at the time of stopping at a station is required, for the estimation of the regenerative power amount, but this information may be previously stored in a memory (not shown) in the changeover-switch switching plan creation unit 131 or may be stored in the database 121.

The train timetable in the timetable planning system is taken into the power management apparatus 101, and thereby the presence or absence of the interchange of the regenerative power between trains can be found, and the operation diagram and the data of the type and classification in the train-set utilization plan creation device is used, and thereby it is possible to identify the train 102 wherein its regenerative power is not interchanged between trains, and is to be stored in the energy storage device 105. And, it becomes possible to estimate the regenerative power amount generated when the train 102 is braked, by collating the type and classification and the regenerative power amount per formation for each type and classification.

As another estimation method of regenerative power, a method may be thought of, wherein the power management apparatus 101 acquires a brake pattern from the train passing information obtained from an ATC (Automatic Train Control) or another ground device (a brake pattern may be directly obtained from an on-vehicle device), and calculates a regenerative power amount, using a regenerative brake force in the train characteristic that has previously been provided in the power management apparatus 101. Specifically, a regenerative power [kW/MM] for each motor is obtained by a speed [m/s] X a regenerative brake force [kN/MM], and the regenerative powers are integrated for the whole motors, to calculate a regenerative power amount [kWh/MM] of the relevant train 102.

The estimation of the regenerative power amount is performed by the above-described method, but practically, there may a case in which the regenerative power slightly flows to a next station. Accordingly, a value which is obtained by multiplying the power amount in case that 100% of the regenerative power is inputted to the station, by a coefficient α is determined as a power amount to be stored in the energy storage device 105. Here, the coefficient α is in a range from 0 to 1. In addition, an experience value is used as the coefficient α, and the coefficient α is to be obtained by comparing a value which is obtained by summing the value of the regenerative power amount for each type and classification per formation which is generated at the time of stopping at the station during a unit time, with a power amount stored in the energy storage device 105 which is stored in the database 121 as the control result.

In addition, as another method, there is also a method which retrieves a train of the same type and classification in the past same train diagram using the database 121, and estimates a regenerative power amount by citing the regenerative power amount which the train has generated.

The changeover-switch switching plan creation unit 131 creates a plan of switching the switch-A 104 and the switch-B 106 for each unit time (60 minutes, for example). The switch-A 104 and the switch-B 105 are to be switched for each optional unit time, and this plan is to be created on the previous day, or at midnight or in the early morning. In addition, the unit time is optionally set to such a time that even if the SOC width is temporarily exceeded, the performance deterioration of the energy storage device 105 has not been affected. In the present embodiment, the unit time may be set to one hour, for example.

To begin with, the changeover-switch switching plan creation unit 131 judges the presence or absence of the interchange of the generative power between the trains 102 up to an optional unit time later (134). Specifically, the estimation of the regenerative power is performed with the above-described method, and a threshold value (10 kWh, for example) relating to the power amount which is estimated to be inputted to the energy storage device 105 has been determined. If the power amount inputted to the energy storage device 105 in the unit time is larger than the threshold value, it is assumed that there is no interchange of the regenerative power between trains, and if the power amount inputted to the energy storage device 105 in the unit time is smaller than the threshold value, it is assumed that there is interchange of the regenerative power between trains.

The presence or absence of the interchange of the regenerative power between the trains up to the optional unit time later is judged (FIG. 4, step S101), and when it is determined that the interchange between the trains is present, the switch-A 104 is closed during the unit time (FIG. 4: step S102), and the power of the energy storage device 105 is to be used at the distribution system 108 side. In addition, when it is determined that the interchange between the trains is not present, the switch-B 106 is closed during the unit time (FIG. 4: step S103), and the power of the energy storage device 105 is to be used at the feeder 111 side. Here, when the energy storage device 105 is used at the feeder 111 side, charging of the regenerative power to the energy storage device 105, and the power discharging from the energy storage device 105 for the power running of the train 102 are performed.

When having created the changeover-switch switching plan of an optional unit time as described above, as a processing (135) of the changeover-switch switching plan creation, the changeover-switch switching plan creation unit 131 next creates the changeover-switch switching plan in a next optional unit time. On the previous day or till the early morning of the plan object day, the creation of the plan of one day of the object day is to be finished, but when the abrupt change in the performance of the train 102 to be used is found before the plan is performed, the changeover-switch switching plan is to be re-created again.

Energy storage device information which the power management apparatus 101 has acquired from the energy storage device 105 is sent to the changeover-switch switching determination/instruction unit 132. The energy storage device information here is a battery remaining amount. When the changeover-switch switching plan is "close the switch-A" (FIG. 5: when determined to be YES in step S201), and when the battery remaining amount is present, with reference to the battery remaining amount data from the energy storage device information (FIG. 5: when determined as Yes in step S202), or when the changeover-switch switching plan is not "close the switch-A" (FIG. 5: when determined as No in step S201), the switching instruction for the switch-A 104 and the switch-B 106 is outputted according to the changeover-switch switching plan outputted from the changeover-switch switching plan creation unit 131 (FIG. 5: step S203).

However, when the changeover-switch switching plan is "close the switch-A" (FIG. 5: when determined as Yes in step S201), and when the battery remaining amount is not present, with reference to the battery remaining amount data from the energy storage device information, (FIG. 5: when determined as No in step S202), the changeover-switch switching determination/instruction unit 132 changes the instruction to "close the switch-B" (FIG. 5: step S204), irrespective of the changeover-switch switching plan. The reason for doing this is because it is meaningless to close the switch-A 104, in the state that the battery remaining amount of the energy storage device 105 is not present. In addition, the present embodiment is configured such that only any one of the switch-A 104 and the switch-B 105 can be closed, and the switch-A 104 is controlled to be opened by the instruction of "close the switch-B".

Figure 5:
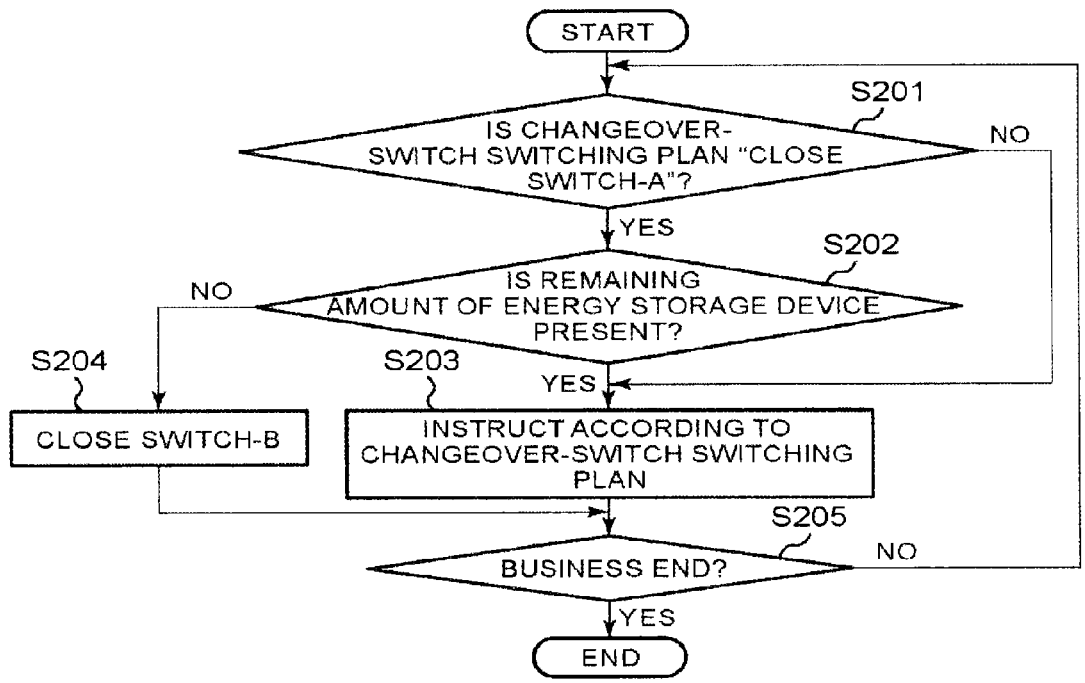
FIG. 5 is an operation flow chart of the changeover-switch switching determination/instruction unit in the first embodiment.

The changeover-switch switching determination/instruction unit 132 performs a processing (136) of the above-described changeover-switch switching control till the business closing time (FIG. 5: in the judgment of step S205, ends by Yes/returns to step S201 by No).

The control result storage unit 133 performs a processing (137) to store an actual result of one day's control result for each unit time. The contents to be stored which is shown in FIG. 6-1 as an example are the changeover-switch switching plan from the changeover-switch switching plan creation unit 131 for each unit time (one hour in the shown example), the changeover-switch switching instruction from the changeover-switch switching determination/instruction unit 132, the energy storage device remaining amount at the time of stating the unit time obtained from the energy storage device 105, the regenerative power amount stored in the energy storage device 105, the power amount discharged from the energy storage device 105. And the coefficient α is stored which is obtained by comparing the regenerative power amount data for each type kind that has been previously stored, and the regenerative power amount stored in the energy storage device 105. Here, the "changeover-switch switching plan" is a switching plan for the switch-A and the switch-B which the plan creation unit 131 has created. For example, it is planed that the switch-A is closed, during times 8:00-9:00. The "changeover-switch switching instruction" is a switching instruction of the determination/instruction unit 132 based on the "changeover-switch switching plan". The "energy storage device remaining amount at starting time" is a remaining charge power amount at the starting time in the unit time. The "power amount discharged from the energy storage device" is a power amount discharged from the energy storage device 105 during the unit time.

In addition, in order to estimate the regenerative power amount from the past data, an operation diagram based on the acquired train information such as an arrival time, a direction, a type and classification, and a main motor of the train 102 which has stopped at the station, the number of the main motors per formation, an ideal regenerative power amount obtained from the main motors per formation, and information indicating the property of the train on the operation diagram are stored in the data base 121 (refer to FIG. 6-2). These data can be used at the time of creating the changeover-switch switching plan as described above.

According to the power management apparatus 101 configured as described above, the presence or absence of the interchange of the regenerative power is judged, the changeover-switch switching plan is created, an instruction to switch the two switches is outputted, and thereby the regenerative power which has not been interchanged between the trains 102 is stored in the energy storage device 105, and the stored regenerative power is discharged to a train performing power running and the station facilities 109, and accordingly, it becomes possible to effectively use the energy in the station system and the electric railway system.

In the present embodiment, it is possible to make the energy storage device 105 which stores the power such as the regenerative power, and discharges the power to the feeder or the distribution system perform effective charging/discharging.

Second Embodiment

Figure 7:
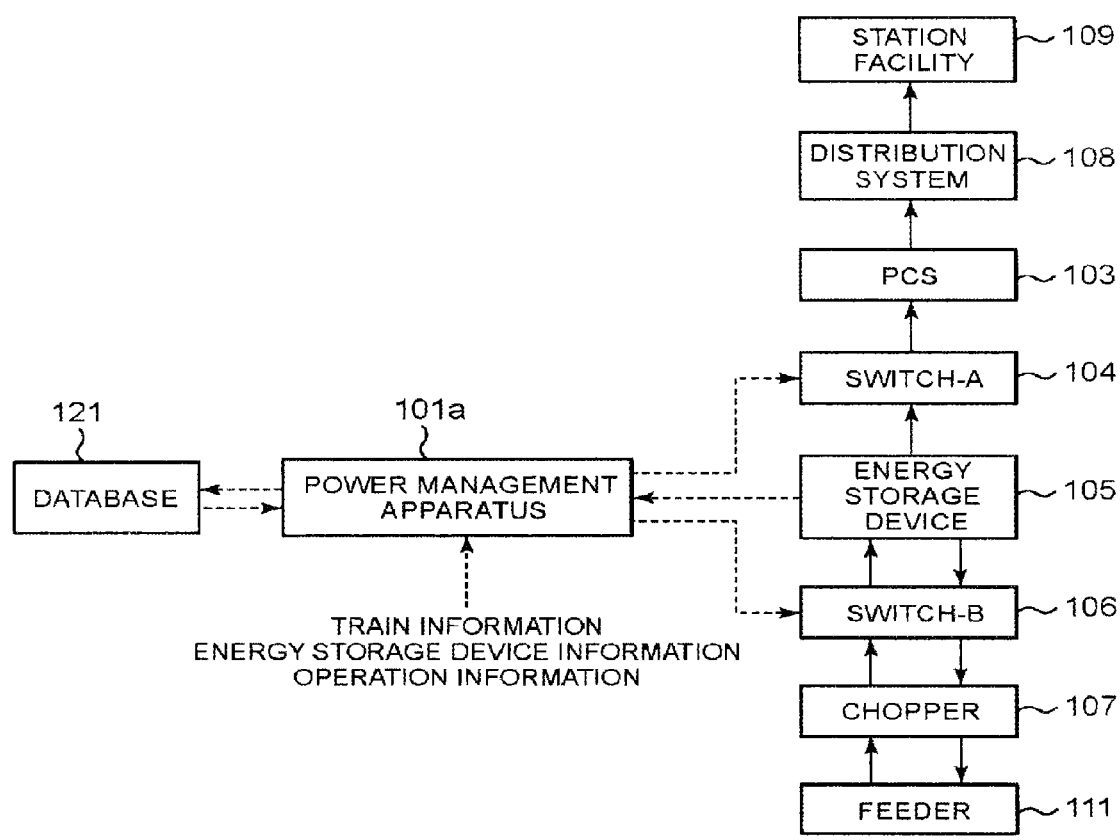
FIG. 7 is a block diagram showing a power management apparatus in a second embodiment, related devices, and a flow of data and signals to be exchanged.
Figure 8:
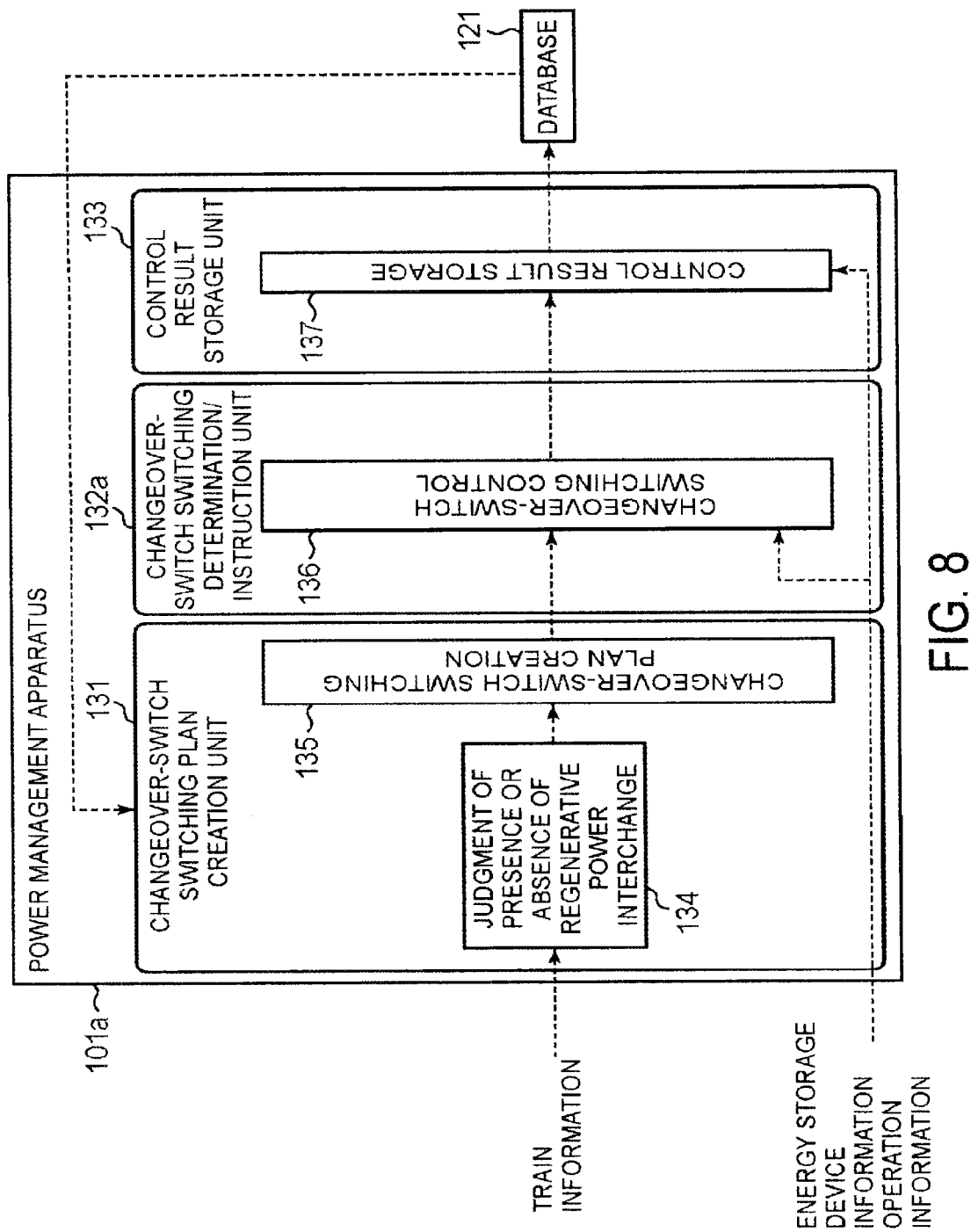
FIG. 8 is a block diagram of the power management apparatus in the second embodiment.

Next, a second embodiment will be described. The present embodiment is an embodiment which can deal with an accident such as a train accident for the first embodiment. A power management apparatus 101a of the present embodiment, and the related devices, and a flow (an arrow of a dotted line) of data and signals to be exchanged and a flow (an arrow of a continuous line) of power supply are shown in FIG. 7, and a configuration of the power management apparatus 101a of the present embodiment is shown in FIG. 8. As shown in FIG. 7 and FIG. 8, the fundamental configuration thereof is the same as that of the first embodiment, and regarding the common matters, the description thereof will be omitted.

The present embodiment is different from the first embodiment in the point that operation information is used in a changeover-switch switching determination/instruction unit 132a. Here, the operation information is information including a train operation control time.

The changeover-switch switching determination/instruction unit 132a judges the presence or absence of the occurrence of an accident from the acquired operation information (step S301). When an accident occurs (Yes, in step S301), and when an operation control time is longer than a threshold value (n minutes in FIG. 9: the value of n can be determined empirically, for example) relating to the operation control time (No, in step S302), in this case, since the train does not move and power is not used at the feeder side, the instruction of "close the switch-A" is outputted (step S303).

On the other hand, when the operation control time is shorter than the above-described threshold value (Yes, in step S302), the changeover-switch switching determination/instruction unit 132a outputs the instruction of "close the switch-B" (step S304). This is performed because, when the train 102 becomes in the normal operation state, and though the regenerative power is present, if there is not one to consume and absorb it, since regeneration invalidation occurs, the switch-B 106 is closed, to make the regenerative power from the feeder 111 side to be stored in the energy storage device 105. However, when the regenerative power has been stored to a full state of the capacity (SOC (State Of Charge)) of the energy storage device 105 (Yes, in step S305), the switch-A 104 is closed, and the stored power is used at the station facility 109 side, and when a capacity for charging becomes available in the energy storage device 105, the switch-B 106 is closed again, to make the energy storage device 105 to be used at the feeder 111 side (step S306). On the other hand, at the time of No, in step S305, the processing moves to a step S307 without change.

In addition, after an accident occurs, operation arrangement is performed, and the operation diagram returns to the original operation diagram, and the information that the operation diagram has returned to the regular operation diagram is obtained from the operation information (in this case, determined as No, in step S301), switching control (processing of the first embodiment) of the two switches is performed using the original changeover-switch switching plan (step S308).

Figure 9:
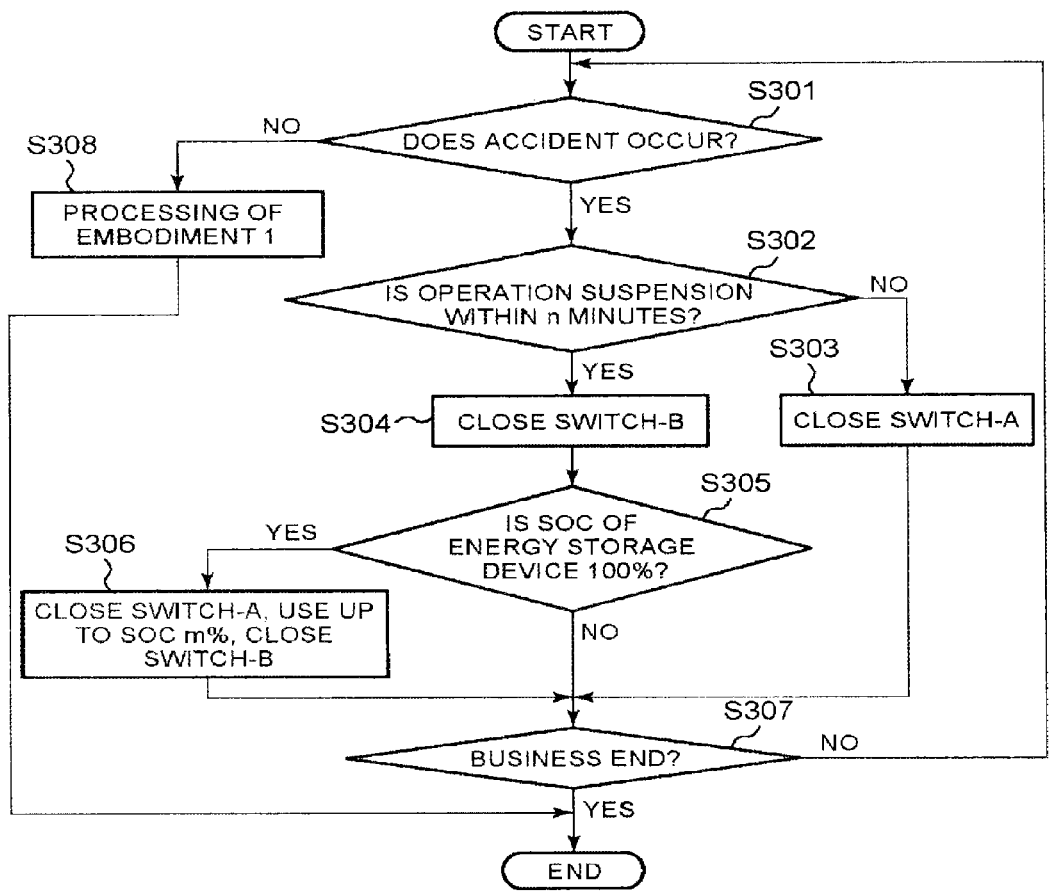
FIG. 9 is an operation flow chart of the changeover-switch switching determination/instruction unit in the second embodiment.

And the changeover-switch switching determination/instruction unit 132a performs the above-described processing (136) of the changeover-switch switching control till the end of the business hour (FIG. 9: by the judgment of step S307, ends by Yes/returns to step S301 by No).

One example of the storage contents of the control result at the time of accident is shown in FIG. 10. In addition to the content of the control result exemplified in FIG. 6-1 in the first embodiment, the accident generating time, and the operation control time are stored as the control result. In the example of FIG. 10, it is shown that during the times 8:00-9:00, "A" that is "close A" in the changeover-switch switching plan is changed to, "B" (that is, "close B") from "A" (that is, "close A") in the changeover-switch switching instruction. In addition, in the present embodiment, when an average of the coefficient α is obtained, the control result at the time of the accident is to be excluded.

In the present embodiment, it is possible to make the energy storage device 105 which charges power such as regenerative power, and discharges the stored power to the feeder or the distribution system perform effective charging/discharging at the accident generating time.

Third Embodiment

Next, a third embodiment will be described. The present embodiment has the same configuration as the above-described second embodiment, but is different in the point that the processing (136) of the changeover-switch switching control by the changeover-switch switching determination/instruction unit 132a takes into consideration of an SOC width described later. Regarding the matters common to the above-described embodiments, the description thereof will be omitted.

Generally, a ratio of a remaining charge amount to a battery capacity of the energy storage device 105 at the time of full charge is called a State of Charge: Charging State (hereinafter, referred to as an SOC). It is said that a proper range of the SOC exists depending on the kind of the energy storage device 105, and performance deterioration of the energy storage device 105 can be prevented by keeping the SOC in the proper range. Here, the proper range of the SOC of the energy storage device 105 is to be called an SOC width.

Figure 11:
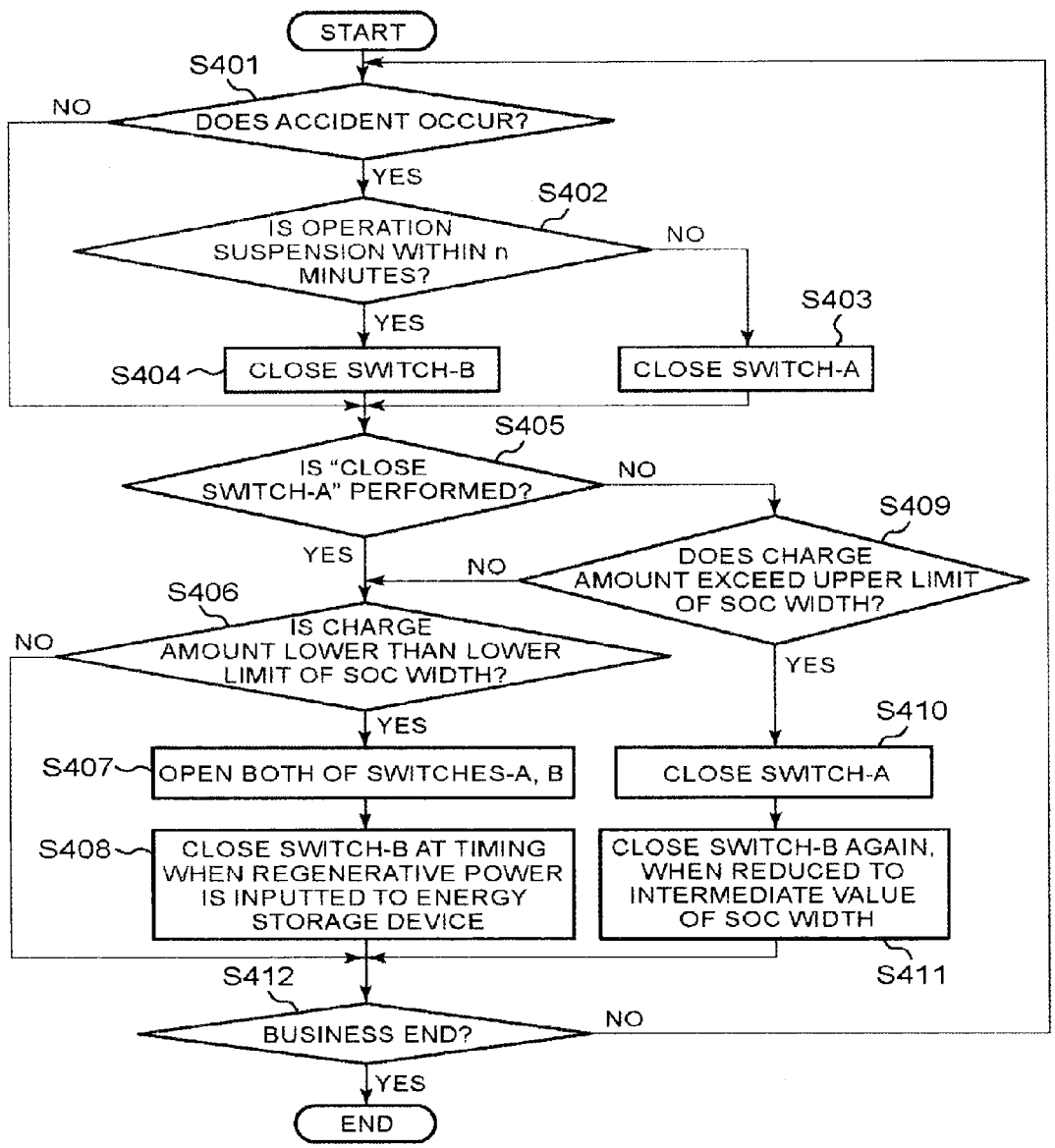
FIG. 11 is an operation flow chart of a changeover-switch switching determination/instruction unit in a third embodiment.

In the present embodiment, the changeover-switch switching determination/instruction unit 132a performs the processing shown in a flow chart of FIG. 11. The steps S401-S404 shown in the same figure are the same as the steps S301-S304 in the second embodiment, and here processings of a step S405 and later will be described.

In the step S405, whether "close the switch-A" has been performed is judged. At the time of this judgment, when "close the switch-A" is performed (Yes, in step S405), and when "close the switch-A" is not performed (No, in step S405), and the charge amount of the energy storage device 105 does not exceed an upper limit of the SOC width (No, in step S409), further whether the charge amount of the energy storage device 105 is lower than a lower limit of the SOC width is judged from the acquired battery device information, and when the charge power amount is lower than the lower limit (Yes, in step S406), the instruction to open both of the switch-A 104 and the switch-B 106 is outputted (step S407). And at the timing when the regenerative power is inputted to the energy storage device 105, the instruction to close the switch-B is outputted (step S408). In addition, in the judgment of the step S406, when the charge amount of the energy storage device 105 is not lower than the lower limit of the SOC width (No, in step S406), the processing moves to a step S412, without particularly performing any processing.

On the other hand, when "close the switch-A" is not performed (No, in step S405), and when the charge amount of the energy storage device 105 exceeds the upper limit of the SOC width (Yes, in step S409), the instruction to close the switch-A is outputted (step S410), By this means, the switch-A 104 is closed, and the switch-B 106 is opened. Then, when the charge amount of the energy storage device 105 is decreased to an intermediate value of the SOC width, the instruction to close the switch-B is outputted again (step S411). By this means, the switch-B 106 is closed, and the switch-A 104 is opened.

The changeover-switch switching determination/instruction unit 132a performs the above-described processing (136) of the changeover-switch switching control till the end of the business hour (FIG. 11: by the judgment of step S412, ends by Yes/returns to step S401 by No).

In the present embodiment, it is possible not only to make the energy storage device 105 which stores power such as regenerative power, and discharges the stored power to the feeder or the distribution system perform effective charging/discharging at the accident generating time, but also to prevent the performance deterioration of the energy storage device 105, by performing control so that the charge amount of the energy storage device 105 is contained in the range of the SOC width.

As described above, according to the first to third embodiments, it becomes possible to make the energy storage device 105 which stores the power such as the regenerative power, and discharges the power to the feeder or the distribution system perform effective charging/discharging.

In addition, the power management apparatuses 101/101a of the various embodiments described above can be realized by such a way that using a general information processing unit, control means composed of its central processing unit and its control program is made to function as the changeover-switch switching plan creation unit 131, the changeover-switch switching determination/instruction unit 132/132a, the control result storage unit 133. In addition, the database 121 can be realized using a storage device which is provided in this information processing unit. In addition, it is possible to realize the power management apparatus 101 of the various embodiments as an exclusive apparatus (hardware).

In addition, in the above description, the power management apparatus performs opening and closing control of the switch-A and the switch-B, to control the charging/discharging to and from the energy storage device 105, but a switch to stop an operation of the power management apparatus, and a changeover-switch respectively for operating the switch-A and the switch-B may be provided in a monitoring room or the like, and after the operation of the power storage apparatus is stopped, a user operates the switches for a switch, and thereby forcible control of the charging/discharging of the energy storage device 105 is performed. In addition, in this case, when one of the switches for a switch instructs to close the switch, it is required to set so that the other switch for a switch cannot instruct to close the switch.

Fourth Embodiment

Next, a fourth embodiment will be described. In addition, the same reference numbers are given to the same portions as in the embodiments 1-3, and the detailed description thereof will be omitted. However, in the embodiments 4-5, the switch-A 104 and the switch-B 106 are respectively referred to as a first switch 104 and a second switch 106, for the convenience of description.

To begin with, since a station system and a railway system to use a power management apparatus of a fourth embodiment is the same as those shown in FIG. 1 described in the first embodiment, the description thereof will be omitted. However, the power management apparatus 101 is different in the point that the power management apparatus 101 determines and instructs switching of the first switch 104 and the second switch 106, while changing an SOC width for each unit time.

That is, the power management apparatus 101 creates a switching plan to switch opening/closing of the first switch 104, the second switch 106, and determines and instructs switching of the first switch 104 and the second switch 106, while changing an SOC width for each unit time, and stores the switching result of the first switch 104 and the second switch 106. In addition, the power management apparatus 101 controls the switching of the first switch 104 and the second switch 106, so as to store the regenerative power of the train 102 in the electric railway system in energy storage device 105, and discharges the stored power to a distribution line 108 and a feeder 114.

Since a block diagram showing the power management apparatus, the related devices, and a flow (an arrow of a dotted line) of data and signals to be exchanged is the same as those shown in FIG. 2, the description thereof will be omitted.

Next, since the configuration of the power management apparatus 101 of the fourth embodiment is the same as that shown in FIG. 3 described in the first embodiment, the description thereof will be omitted.

Figure 4:
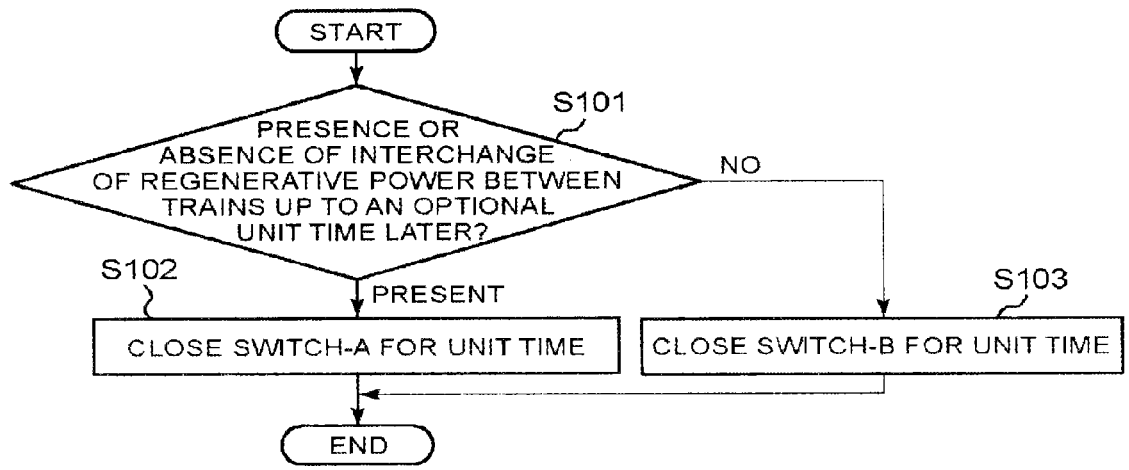
FIG. 4 is an operation flow chart of the changeover-switch switching plan creation unit in the first embodiment.

Since a flow chart to exemplify an operation of the plan creation unit according to the fourth embodiment is also the same as that shown in FIG. 4 described in the embodiment 1, the description thereof will be omitted.

Figure 12:
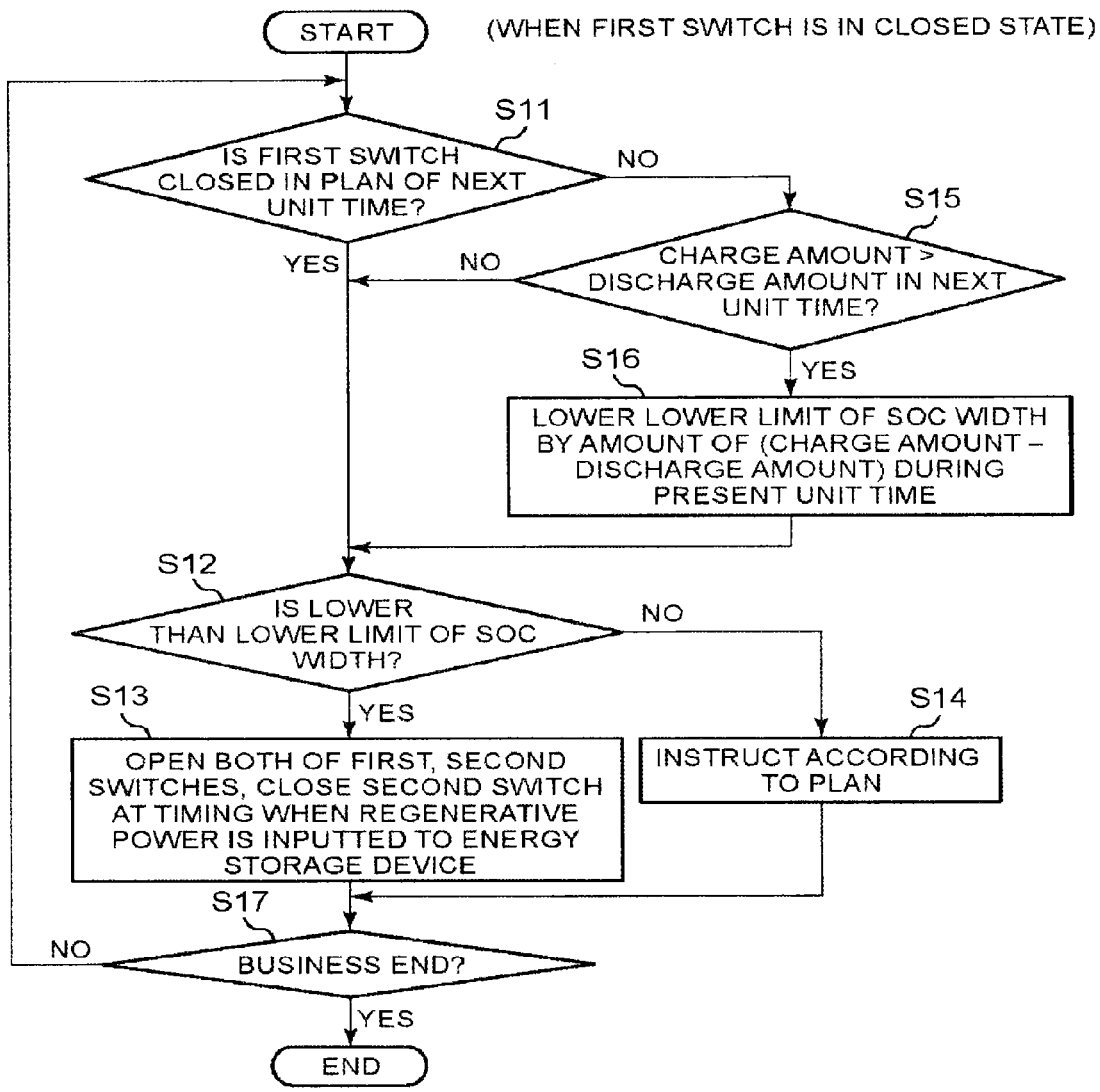
FIG. 12 is a flow chart exemplifying an operation of a changeover-switch switching determination/instruction unit in a fourth embodiment.
Figure 13:
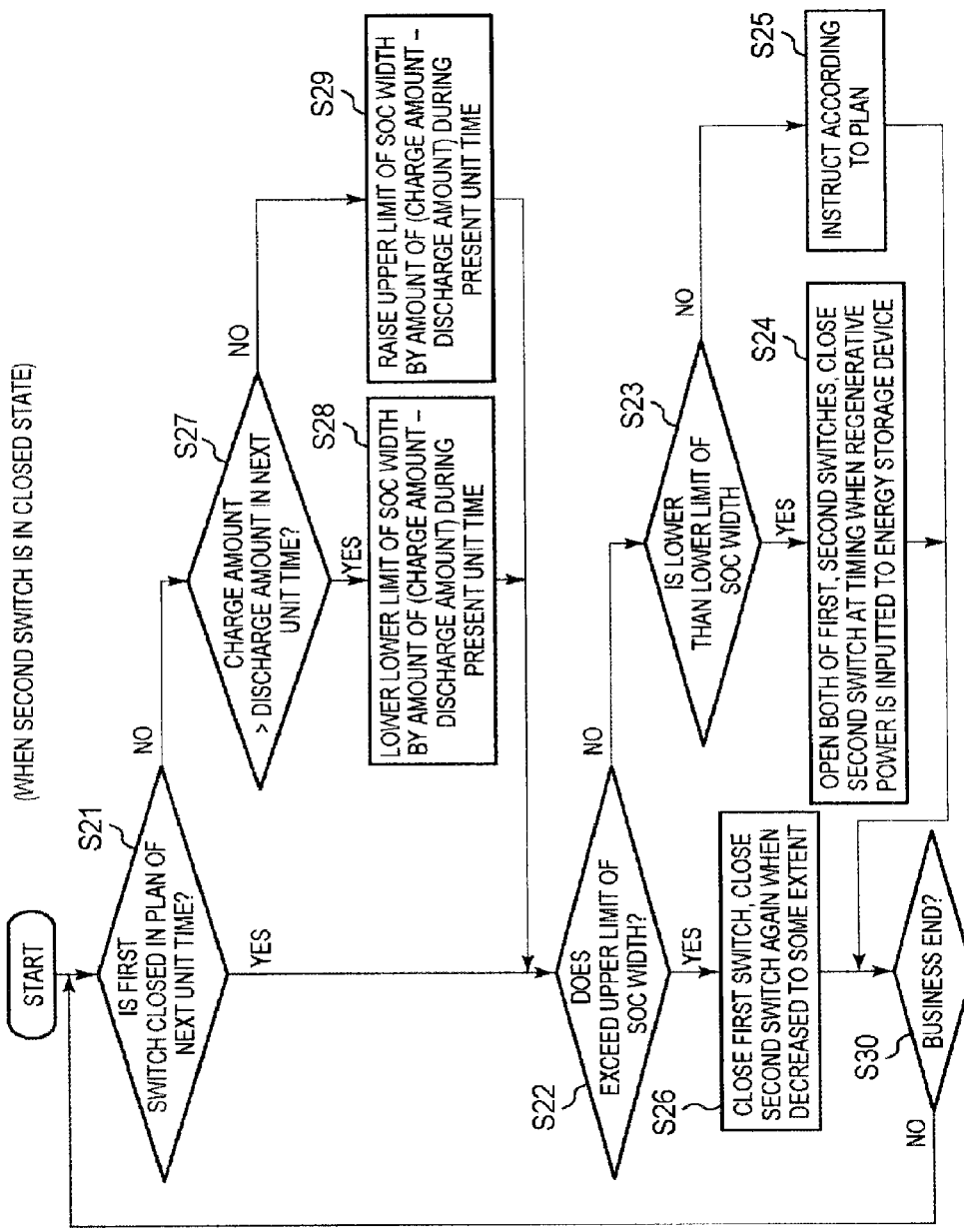
FIG. 13 is a flow chart exemplifying an operation of the changeover-switch switching determination/instruction unit in the fourth embodiment.

FIGS. 12, 13 are flow charts each to exemplify an operation of the determination/instruction unit 132 according to the fourth embodiment. Specifically, FIG. 12 is a flow chart to exemplify an operation when the first switch 104 is in the closed state during a present unit time, and FIG. 13 is a flow chart to exemplify an operation when the second switch 106 is in the closed state during the present unit time.

To begin with, an operation will be described when the first switch 104 is in the closed state during the present unit time. As shown in FIG. 12, when the first switch 104 is in the closed state, the determination/instruction unit 132 determines whether or not to close the first switch 104 in the plan (switching plan) of the next unit time, with reference to the switching plan created by the plan creation unit 131 (S11).

When the plan of the next unit time is "close the first switch 104" (S11: YES), whether or not the remaining charge power amount of the energy storage device 105 is lower than a lower limit of the present SOC width is determined (S12). When the remaining charge power amount is lower than the lower limit of the present SOC width (S12: YES), the determination/instruction unit 132 opens both of the first switch 104 and the second switch 106. And the second switch 106 is closed at the timing when the regenerative power is inputted to the energy storage device 105 (S13). In addition, when the remaining charge power amount is not lower than the lower limit of the present SOC width (S12: NO), the determination/instruction unit 132 instructs according to the plan (switching plan) (S14).

When the plan of the next unit time is "close the second switch 106" (S11: NO), the regenerative power inputted to the energy storage device 105 and the power amount discharged to the power running of the train 102 from the energy storage device 105 are compared in the next unit time, and whether or not (the charge amount in the next unit time)>(the discharge amount in the next unit time) is determined (S15).

When (the charge amount in the next unit time)>(the discharge amount in the next unit time) (S15: YES), the determination/instruction unit 132 lowers the lower limit of the SOC width by an amount of (the charge amount in the next unit time)−(the discharge amount in the next unit time) only in the present unit time (S16). In this manner, the SOC width in the present unit time is lowered by an amount of the power amount that is estimated to be charged in the next unit time, and the remaining charge power amount of the energy storage device 105 can be temporarily lowered, and accordingly it is possible to store more surely the regenerative power in the next unit time to the energy storage device 105, and an amount of the regenerative power temporarily exceeding the SOC width can effectively be used.

When (the charge amount in the next unit time)<(the discharge amount in the next unit time) (S15: NO), the determination/instruction unit 132 does not change the SOC width. (includes the case where the charge amount in the next unit time is the same as the discharge amount in the next unit time)

Having performed the above-described processing, the determination/instruction unit 132 advances the processing to S12. And, when the remaining charge power amount is lower than the lower limit of the present SOC width, both of the first switch 104 and the second switch 106 are opened. And the second switch 106 is closed at the timing when the regenerative power is inputted to the energy storage device 105 (S13). In addition, the remaining charge power amount is not lower than the lower limit of the present SOC width, the determination/instruction unit 132 instructs according to the plan (S14). After the above-described S13, S14, the presence or absence of end of business of the train or the like is determined (S17), and the processings of S11-S14 are continued till the business end.

Next, an operation when the second switch 106 is in the closed state in the present unit time will be described. As shown in FIG. 13, when the second switch 106 is in the closed state, the determination/instruction unit 132 determines whether or not to close the first switch 104 in the plan (switching plan) in the next unit time, with reference to the switching plan created by the plan creation unit 131 (S21).

When the plan of the next unit time is "close the first switch 104" (S21: YES), whether or not the remaining charge power amount of the energy storage device 105 exceeds the upper limit of the present SOC width is determined (S22). When the remaining charge power amount exceeds the upper limit of the present SOC width (S22: YES), the determination/instruction unit 132 closes the first switch 104, and when the battery remaining amount is decreased to a certain extent, the determination/instruction unit 132 closes the second switch 106 again (S26). The threshold value shall be set optionally by a user.

When the remaining charge power amount does not exceed the upper limit of the present SOC width (S22: NO), the determination/instruction unit 132 determines whether or not the remaining charge power amount of the energy storage device 105 is lower than the lower limit of the present SOC width (S23). When the remaining charge power amount is lower than the lower limit of the present SOC width (S23: YES), the determination/instruction unit 132 opens both of the first switch 104 and the second switch 106. And the determination/instruction unit 132 closes the second switch 106 at the timing when the regenerative power is inputted to the energy storage device 105 (S24). In addition, when the remaining charge power amount is not lower than the lower limit of the present SOC width (S23: NO), the determination/instruction unit 132 instructs according to the plan (switching plan) (S25).

When the plan of the next unit time is "close the second switch 106" (S21: NO), the regenerative power amount inputted to the energy storage device 105 in the next unit time and the power amount discharged to the power running of the train 102 from the energy storage device 105 are compared, and whether or not (the charge amount in the next unit time)>(the discharge amount in the next unit time) is determined (S27).

When (the charge amount in the next unit time)>(the discharge amount in the next unit time) (S27: YES), the determination/instruction unit 132 lowers the lower limit of the SOC width by an amount of (the charge amount in the next unit time)−(the discharge amount in the next unit time) only during the present unit time (S28). In this manner, the SOC width in the present unit time is lowered by an amount of the power amount that is estimated to be charged in the next unit time, and the remaining charge power amount of the energy storage device 105 can be temporarily lowered, and accordingly, it is possible to store more surely the regenerative power in the next unit time to the energy storage device 105, and an amount of the regenerative power temporarily exceeding the SOC width can effectively be used.

When (the charge amount in the next unit time)<(the discharge amount in the next unit time) (S27: NO), the determination/instruction unit 132 increases the upper limit of the SOC width by an amount of (the charge amount in the next unit time)−(the discharge amount in the next unit time) only during the present unit time (including the case where the charge amount in the next unit time and the discharge amount in the next unit time are the same) (S29). In this manner, the width of the SOC width in the present unit time is increased by the amount of the power amount that is estimated to be discharged in the next unit time, and the remaining charge power amount of the energy storage device 105 can be temporarily increased, it is possible to store the power amount that is estimated to be discharged in the next unit time to the energy storage device 105, and an amount of the regenerative power temporarily exceeding the SOC width can effectively be used.

Having performed the above-described processing, the determination/instruction unit 132 advances the processing to S22. And, When the remaining charge power amount exceeds the upper limit of the present SOC width (S22: YES), the first switch 104 is closed, and when the battery remaining amount is decreased to a certain amount, the second switch 106 is closed again (S26). When the remaining charge power amount does not exceed the upper limit of the present SOC width (S22: NO), and is lower than the lower limit of the present SOC width (S23: YES), both of the first switch 104 and the second switch 106 are opened. And the second switch 106 is closed at the timing when the regenerative power is inputted to the energy storage device 105 (S24). In addition the remaining charge power amount is not lower than the lower limit of the present SOC width (S23: NO), the determination/instruction unit 132 instructs according to the plan (S25). After the above-described S24-S26, the presence or absence of end of business of the train or the like is determined (S30), and the processing of S21-S26 are continued till the business end.

Here, a continuation of the functional configuration of the power management apparatus 101 will be described using FIG. 3. The storage unit 133 of the power management apparatus 101 stores the actual result of one day (control result) in the database 121 and so on for each unit time (137). The contents to be stored are the switching plan created by the plan creation unit 131, the content that the determination/instruction unit 132 has controlled the first switch 104 and the second switch 106, that is the switching instruction from the determination/instruction unit 132, the remaining charge power amount obtained from the energy storage device 105 at the time of stating the unit time, the regenerative power amount stored in the energy storage device 105, the power amount discharged from the energy storage device 105. In addition, the storage unit 133 stores the coefficient α which is obtained by comparing the regenerative power amount data for each type kind that has been previously stored, and the regenerative power amount stored in the energy storage device 105.

In addition, the storage unit 133 stores an arrival time, a direction, a type and classification and a main motor of the train which has stopped at the station, and an ideal regenerative power amount obtained from the main motor, in the database 121, in order to estimate the regenerative power amount from the past data. These data stored in the database 121 can be used at the time of creating the switching plan of the first switch 104 and the second switch 106.

Fifth Embodiment

Next, a fifth embodiment will be described. The fifth embodiment acquires a load (power consumption) of the station facility 109 per unit time, and estimates a power amount discharged from the energy storage device 105 to the station facility 109. And using the estimated power amount, the SOC width is changed for each unit time. In addition, the same symbols are given to the same configurations as in the first to third embodiments, and the description thereof will be omitted.

Figures 14, 15:
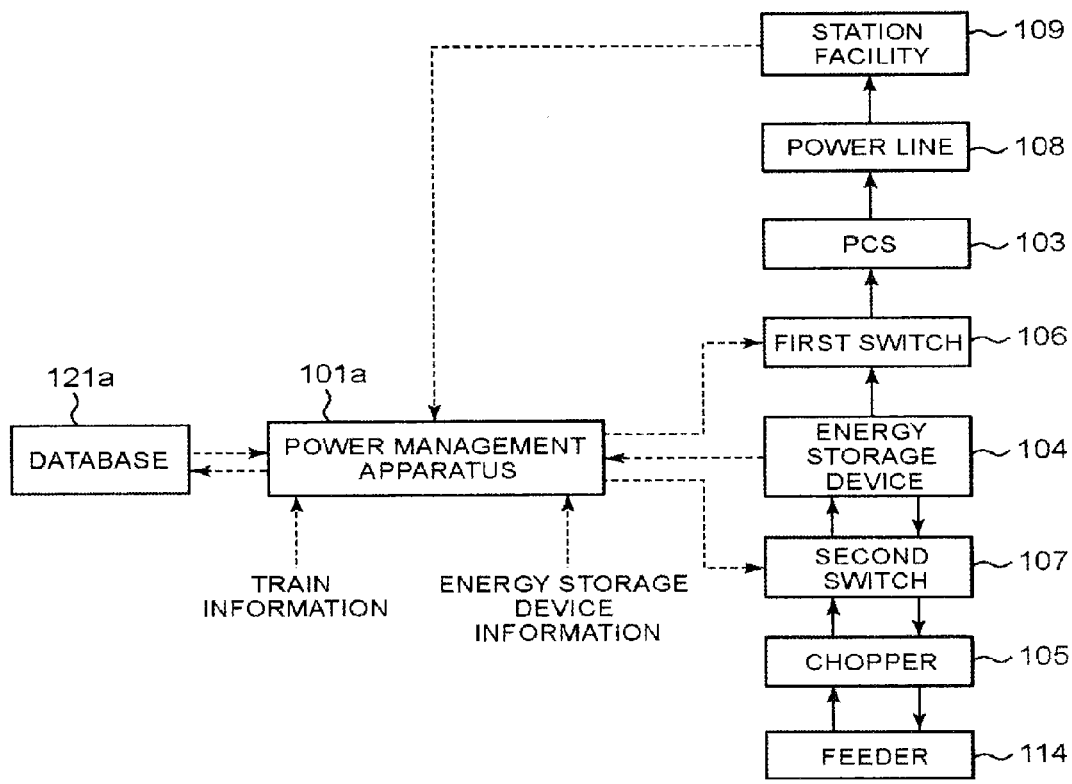
FIG. 14 is a block diagram showing a power management apparatus in a fifth embodiment, related devices, and a flow of data and signals to be exchanged.
FIG. 15 is a diagram exemplifying a data structure of the database.

FIG. 14 is a block diagram showing the power management apparatus 101a according to the fifth embodiment, the related devices, and a flow of data and power to be exchanged. As shown in FIG. 15, the power management apparatus 101a estimates a power amount to be discharged from the energy storage device 105 to the station facility 109, with reference to a database 121a in which information regarding loads of the station facility 109 for each unit time is recorded.

FIG. 15 is a diagram exemplifying a data structure of the database 121a. As shown in FIG. 15, the database 121a records loads ("station facility 1 [kWh], "station facility 2 [kWh]" . . . ) of the station facility 109 for each unit time (one hour, in the shown example). The power management apparatus 101a refers to the database 121a, and thereby can estimate a power amount discharged from the energy storage device 105 to the station facility 109 for each unit time.

Figure 16:
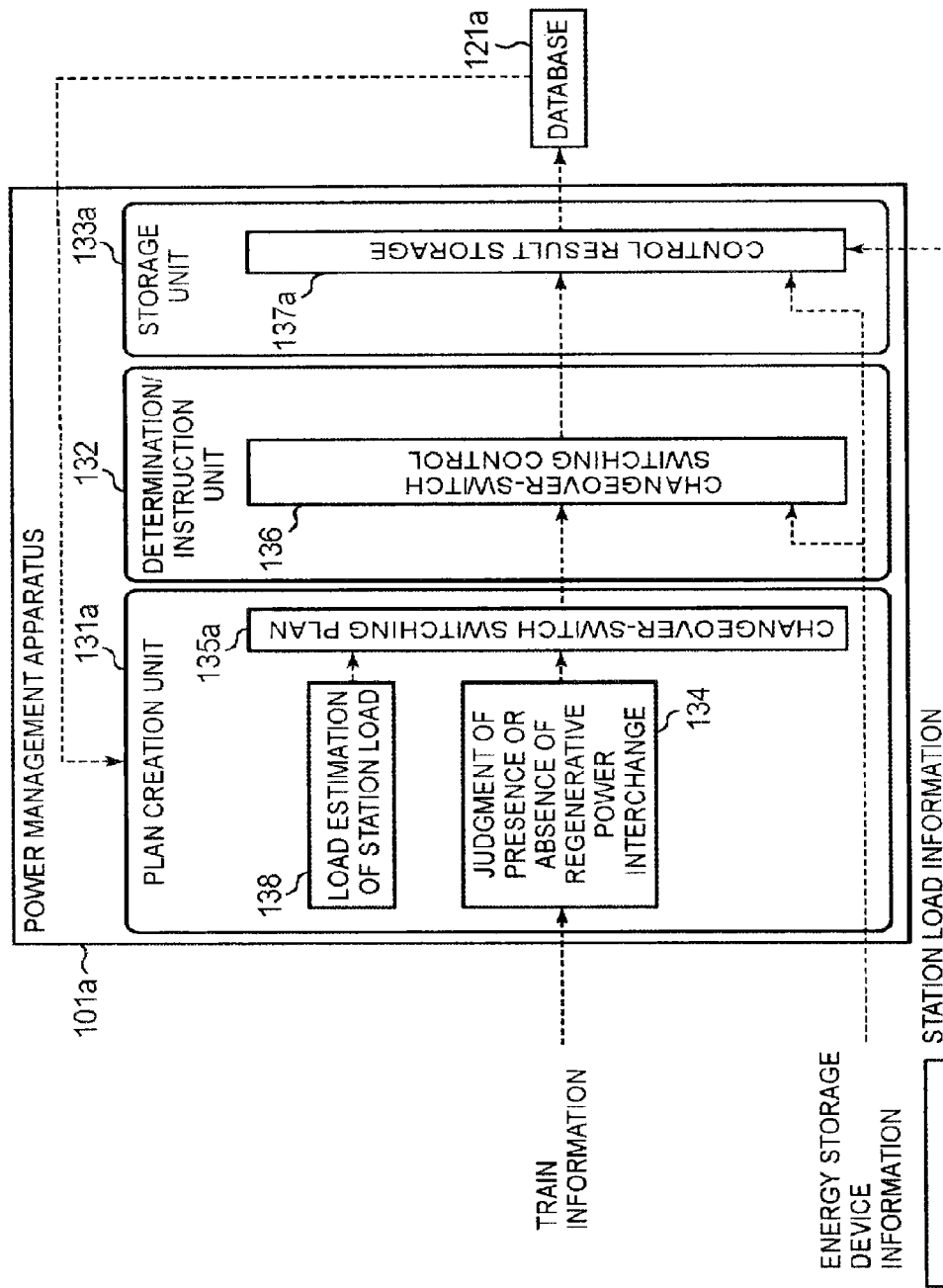
FIG. 16 is a block diagram showing a configuration of the power management apparatus in the fifth embodiment.

FIG. 16 is a block diagram showing a configuration of the power management apparatus 101a according to the fifth embodiment. As shown in FIG. 16, the plan creation unit 131a refers to the database 121a, to perform load estimation of the station facility 109 for each unit time (138). And the plan creation unit 131a creates a switching plan of the first switch 104 and the second switch 106, based on the load estimation of the station facility 109 (135a)

When storing an actual result (control result) of one day for each unit time in the database 121 and so on, a storage unit 133a acquires station load information indicating a power amount actually consumed in the station facility 109 in the unit time, and stores it along with the control result in the database 121 (137a). It is possible to utilize the data stored in the database 121a at the time of creating the switching plan of the first switch 104 and the second switch 106.

Figure 17:
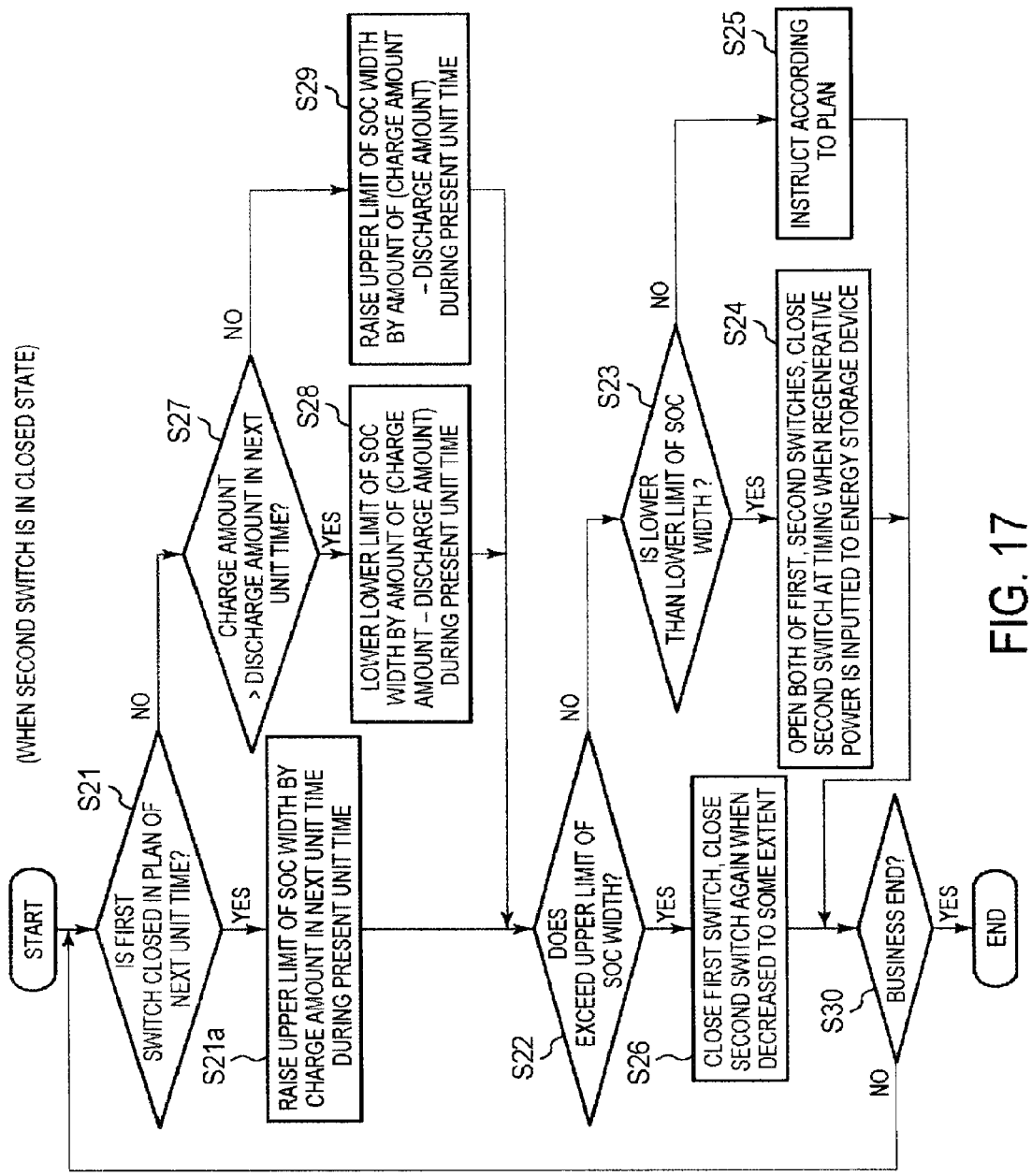
FIG. 17 is a flow chart exemplifying an operation of the changeover-switch switching determination/instruction unit in the fifth embodiment.

Next, an operation of the determination/instruction unit 132 in the fifth embodiment will be described. FIG. 17 is a flow chart exemplifying an operation of the determination/instruction unit 132 according to the fifth embodiment. More specifically, FIG. 17 is a flow chart exemplifying an operation when the second switch 106 is in the closed state in the present unit time.

As shown in FIG. 17, the fifth embodiment is different from the fourth embodiment in the point that in the case that the plan of the next unit time is "close the first switch 104" (S21: YES), an upper limit of the SOC width is raised in the present unit time, by a load estimation portion (discharge amount portion) of the station facility 109 in the next unit time (S21a). As in this manner, the SOC width is raised in the present unit time, by the power amount portion that is estimated to be discharged in the station facility 109 in the next unit time, and the remaining charge power amount of the energy storage device 105 can be raised temporarily, and thereby a power amount that is estimated to be discharged in the station facility 109 in the next unit time can be stored in the energy storage device 105, and thereby an amount of the regenerative power temporarily exceeding the SOC width can effectively be used.

In addition, the program to be executed in the power management apparatus 101, 101a of the present embodiment is provided in a state that it is previously installed in a ROM and so on. The program to be executed in the power management apparatus 101, 101a of the present embodiment may be configured such that the program is presented in a state that it is stored in a computer readable recording medium, such as a CD-ROM, a flexible disk (FD), a CD-R, a DVD (Digital Versatile Disk) in a file form of an installable format or an executable format.

Further, the program to be executed in the power management apparatus 101, 101a of the present embodiment may be configured such that the program is stored on a computer connected to a network such as Internet, and is presented by being downloaded through the network. In addition, the program to be executed in the power management apparatus 101, 101a of the present embodiment may be configured such that the program is provided or distributed through a network such as Internet.

The program to be executed in the power management apparatus 101, 101a of the present embodiment has a module structure including the above-described functional configuration, and as an actual hardware, a CPU (processor) reads the program from the above-described ROM, and executes the program, and thereby the above-described respective units are loaded on a main storage device, and generated on the main storage device.

In addition, the present invention is not limited to the above-described embodiments without change, but may be embodied without departing from the spirit of the inventions by changing the constituent elements in the embodiment stage. In addition, various inventions may be formed by appropriately combining a plurality of constituent elements disclosed in the above-described embodiments. For example, some constituent elements may be deleted from the all constituent elements shown in the embodiment. Further, the constituent elements over the different embodiments may be appropriately combined.

What is claimed is:

1. A power management apparatus, comprising: switching plan creation means which creates a switching plan for switching control of opening/closing of a first switch provided between an energy storage device and a distribution system side, and a second switch provided between the energy storage device and a feeder side; and switching determination/instruction means which determines a switching control content to the first switch and the second switch according to the switching plan created by the switching plan creation means, and outputs a determined instruction to the first switch and the second switch; wherein the switching plan creation means determines presence or absence of interchange of regenerative power between trains within a given time range, based on train information including an operation diagram, and when the interchange of the regenerative power between the trains is present, creates the switching plan to close the first switch for a unit time, and when the interchange of the regenerative power between the trains is not present, creates the switching plan to close the second switch for the unit time.

2. The power management apparatus as recited in claim 1, wherein: the switching determination/instruction means outputs the instruction according to the switching plan created by the switching plan creation means without change, when a remaining amount is present in the energy storage device, and outputs the instruction to close the second switch irrespective of the switching plan, when the remaining amount is not present in the energy storage device.

3. The power management apparatus as recited in claim 1, further comprising storage means to store a control result by the switching determination/instruction means:
wherein the switching plan creation means creates the switching plan with reference to the control result stored in the storage means.

4. The power management apparatus as recited in claim 1, wherein: the switching determination/instruction means outputs the instruction to close the first switch, irrespective of the switching plan created by the switching plan creation means, when an operation control time exceeds a prescribed time based on operation information.

5. The power management apparatus as recited in claim 1, wherein: the switching determination/instruction means outputs the instruction to close the second switch, irrespective of the switching plan created by the switching plan creation means, when an operation control time is within a prescribed time based on operation information.

6. The power management apparatus as recited in claim 5, wherein: the switching determination/instruction means outputs the instruction to close the second switch, when the operation control time is within the prescribed time based on the operation information, and then outputs the instruction to close the first switch, when the energy storage device is stored up to a capacity in a fully charged state, and after making the energy storage device discharge a prescribe amount, outputs the instruction to close the second switch.

7. The power management apparatus as recited in claim 4, wherein: the switching determination/instruction means, when having performed to close the first switch, or when having not performed to close the first switch and when a charge amount of the energy storage device does not exceed an upper limit of an range of an SOC (State Of Charge) capable of preventing deterioration of the energy storage device, and further when the charge amount of the energy storage device is lower than a lower limit of the range of the SOC, outputs the instruction to open both of the first switch and the second switch, and outputs the instruction to close the second switch at an timing when the regenerative power is inputted to the energy storage device.

8. The power management apparatus as recited in claim 4, wherein: the switching determination/instruction means, when having not performed to close the first switch, and a charge amount of the energy storage device exceeds an upper limit of a range of an SOC capable of preventing deterioration of the energy storage device, outputs the instruction to close the first switch, and outputs the instruction to close the second switch when the charge amount of the energy storage device is decreased to an intermediate value of the range of the SOC.

9. A power management system comprising:
an energy storage device which feeds power to a power line for feeding power to a ground facility and a feeder for feeding power to a train;
a first switch provided between the energy storage device and the power line;
a second switch provided between the energy storage device and the feeder; and
a power management apparatus to perform switching control of the first switch and the second switch;
wherein the power management apparatus comprises:
plan creation means which determines whether or not an interchange of a regenerative power between trains is present for each prescribed time width, using an operation diagram of the trains and creates a switching control plan for the first switch and the second switch based on this determination result; and
control means which, based on the switching control plan created by the plan creation means and a charging state of the energy storage device, controls switching of the first switch and the second switch so that the charging state of the energy storage device becomes within a prescribed charging range, and changes the prescribed charging range in accordance with the regenerative power that is estimated to be stored in the energy storage device based on the operation diagram of the trains.

10. The power management system as recited in claim 9, wherein: the plan creation means creates the switching control plan to close the first switch, when determining that the interchange of the regenerative power is present for each prescribed time width.

11. The power management system as recited in claim 9, wherein: the plan creation means creates the switching control plan to close the second switch, when determining that the interchange of the regenerative power is not present for each prescribed time width.

12. The power management system as recited in claim 9, wherein: the control means, when closing the second switch in the switching control plan of the next prescribed time width, and when a charge amount of the energy storage device in the relevant next prescribed time width is estimated to exceed a discharge amount, based on the regenerative power amount estimated in the next prescribe time width, lowers a lower limit value of the prescribed charging range by the charge amount that is estimated to exceed during the present prescribed time width.

13. The power management system as recited in claim 9, wherein: the control means, when closing the second switch in the switching control plan of the next prescribed time width, and when a discharge amount of the energy storage device in the relevant next prescribed time width is estimated to be not less than a charge amount, based on the regenerative power amount estimated in the next prescribe time width, raises an upper limit value of the prescribed charging range by the discharge amount that is estimated to exceed during the present prescribed time width.

14. The power management system as recited in claim 9, wherein: the control means, when closing the first switch in the switching control plan of the next prescribed time width, raises an upper limit value of the prescribed charging range by an amount corresponding to a discharge amount to the power line during the present prescribe time width, based on load information indicating a load of the power line that is estimated in the next prescribed time width.

15. The power management system as recited in claim 9, wherein: the power management apparatus further comprises recording means which records the created switching control plan, the contents that the control means has controlled the first switch and the second switch, the regenerative power amount stored in the energy storage device, the power amount discharged from the energy storage device, for each prescribed time width.

16. In a power management apparatus which controls feeding of a power stored in an energy storage device to a ground facility via a power line, and feeding of the power to a train via a feeder, the power management apparatus comprising:
control means which controls switching of a first switch provided between the energy storage device and the power line and a second switch provided between the energy storage device and the feeder; and
plan creation means which determines whether or not an interchange of a regenerative power between trains is present for each prescribed time width, using an operation diagram of the trains and creates a switching control plan for the first switch and the second switch based on this determination result;
wherein the control means, based on the switching control plan created by the plan creation means and a charging state of the energy storage device, controls switching of the first switch and the second switch so that the charging state of the energy storage device becomes within a prescribed charging range, and changes the prescribed charging range in accordance with the regenerative power that is estimated to be stored in the energy storage device based on the operation diagram of the trains.

17. The power management apparatus as recited in claim 16, wherein: the plan creation means creates the switching control plan to close the first switch, when determining that the interchange of the regenerative power is present for each prescribed time width.

18. The power management apparatus as recited in claim 16, wherein: the plan creation means creates the switching control plan to close the second switch, when determining that the interchange of the regenerative power is not present for each prescribed time width.

19. The power management apparatus as recited in claim 16, wherein: the control means, when closing the second switch in the switching control plan of the next prescribed time width, and when a charge amount of the energy storage device in the relevant next prescribed time width is estimated to exceed a discharge amount, based on the regenerative power amount estimated in the next prescribe time width, lowers a lower limit value of the prescribed charging range by the charge amount that is estimated to exceed during the present prescribed time width.

20. The power management apparatus as recited in claim 16, wherein: the control means, when closing the second switch in the switching control plan of the next prescribed time width, and when a discharge amount of the energy storage device in the relevant next prescribed time width is estimated to be not less than a charge amount, based on the regenerative power amount estimated in the next prescribe time width, raises an upper limit value of the prescribed charging range by the discharge amount that is estimated to exceed during the present prescribed time width.

* * * * *